United States Patent
Ilch

(10) Patent No.: US 9,764,482 B2
(45) Date of Patent: Sep. 19, 2017

(54) INDUSTRIAL ROBOT

(71) Applicant: Hartmut Ilch, Kehl (DE)

(72) Inventor: Hartmut Ilch, Kehl (DE)

(73) Assignee: Hartmut Ilch, Kehl (DE)

( * ) Notice: Subject to any disclaimer, the term of this patent is extended or adjusted under 35 U.S.C. 154(b) by 376 days.

(21) Appl. No.: 14/432,914

(22) PCT Filed: Oct. 2, 2013

(86) PCT No.: PCT/DE2013/000560
§ 371 (c)(1),
(2) Date: Apr. 1, 2015

(87) PCT Pub. No.: WO2014/053115
PCT Pub. Date: Apr. 10, 2014

(65) Prior Publication Data
US 2015/0202779 A1 Jul. 23, 2015

(30) Foreign Application Priority Data

Oct. 2, 2012 (DE) .................. 10 2012 019 324

(51) Int. Cl.
*B25J 17/02* (2006.01)
*B25J 9/00* (2006.01)
(52) U.S. Cl.
CPC .......... *B25J 17/0266* (2013.01); *B25J 9/0051* (2013.01); *Y10T 74/20335* (2015.01)
(58) Field of Classification Search
CPC .................... B25J 17/0266; B25J 9/0051
See application file for complete search history.

(56) References Cited

U.S. PATENT DOCUMENTS 4,666,362 A * 5/1987 Landsberger ........ B25J 17/0266
212/239
4,976,582 A * 12/1990 Clavel .................. B25J 9/1065
108/138

(Continued)

FOREIGN PATENT DOCUMENTS

DE 10 2008 019 965 10/2009
DE 10 2008 023 069 11/2009
DE 10 2010 033 429 2/2011

OTHER PUBLICATIONS

WIPO, International Preliminary Report on Patentability, Jul. 4, 2015, PCT/DE2013/000560.

*Primary Examiner* — Terence Boes
(74) *Attorney, Agent, or Firm* — Collard & Roe, P.C.

(57) ABSTRACT

An industrial robot with parallel kinematics comprises a robot base, a carrier element for receiving a gripper, a tool or a machine element, at least two moveable actuating units, which are connected at their one end to actuating unit drives arranged on the robot base and of which the other ends are moveably connected to the carrier element, a first rotational axis, which is designed as a hollow body and which has a continuous cavity running in the axial direction, a first rotational axis drive, which is arranged on the robot base and which generates a first torque and transmits it to the first rotational axis, a second rotational axis, which is arranged at least partially in the first rotational axis, a second rotational axis drive, which is arranged on the robot base and which generates a second torque and transmits it to the second rotational axis.

10 Claims, 12 Drawing Sheets

(56) References Cited

U.S. PATENT DOCUMENTS

| | | | |
|---|---|---|---|
| 2001/0019692 A1* | 9/2001 | Ehrat | B25J 15/0616 414/735 |
| 2004/0143876 A1* | 7/2004 | Persson | B23Q 1/5462 74/490.01 |
| 2010/0206120 A1 | 8/2010 | Kinoshita | |
| 2011/0100145 A1* | 5/2011 | Feng | B25J 17/0266 74/490.01 |
| 2011/0129323 A1* | 6/2011 | Ehrat | B25J 17/0266 414/738 |
| 2012/0118097 A1 | 5/2012 | Ilch | |

* cited by examiner

INDUSTRIAL ROBOT

RELATED APPLICATIONS

This is a national stage application of International Application No.: PCT/DE2013/000560, filed on Oct. 2, 2013, claiming the priority benefit of German Patent Application No. 10 2012 019 324.6, filed on Oct. 2, 2012, both of which applications are hereby incorporated by reference.

FIELD OF INVENTION

The invention is based on an industrial robot with parallel kinematics, comprising a robot base, a carrier element for receiving a gripper or a tool and several actuating units for moving the carrier element.

BACKGROUND OF THE INVENTION

Industrial robots of this type with parallel kinematics are used to move, position and/or process an object in space. They comprise a robot base arranged in a fixed position and a moveable carrier element for receiving a gripper, a tool or a machine element. At least two actuating units are connected at their one end to the robot base and at their other end to the carrier element. Each actuating element is moved by a drive assigned to it which is arranged on the robot base. A movement of the actuating units causes a movement of the carrier element. For example, a gripper for picking up an object or a tool for processing an object or a machine element such as a bearing or a gearbox can be arranged on the carrier element. To this end the carrier element is equipped with a receiver for a gripper, a tool or a machine element. The gripper, the tool or the machine element arranged on the carrier element can be moved in several dimensions in space in a targeted manner by means of the coordinated movement of the driven actuating units. The actuating arms effect a spatial parallelogram guidance of the carrier element. The parallel kinematics resulting from this enable a rapid and precise movement of the carrier element and of the gripper, tool or machine element arranged thereon. This movement is a translatory movement of the carrier element. If the industrial robot is equipped with three actuating units, the translatory movement is in three directions in space. The movement has three degrees of freedom and can be described in a coordinate system with x, y and z axes. If the industrial robot is equipped with two actuating units, the translatory movement is in two directions in space. In this case the movement has two degrees of freedom and can be described in a coordinate system with x and z axes. In addition to this translatory movement of the carrier element, a torque can be generated by a further drive on the robot base and transmitted to a gripper, tool or machine element arranged on the carrier element. This is a rotational movement and hence a further degree of freedom. This movement serves not to position the gripper, tool or machine element in space but instead to move the gripper, tool or machine element itself, for example opening and closing the gripper or turning the tool or machine element. If the industrial robot is equipped with three control arms, a rotational axis transmitting the torque from the drive to a gripper, tool or machine element on the carrier element is referred to as a fourth axis.

Such robots include delta robots, for example. These are equipped with at least two control arms as actuating units. The actuating or control arms comprise an upper and a lower arm section which are connected to one another in a moveable manner. Each of the upper arm sections is driven by an actuating arm drive, for example a motor-gear unit. The drives are arranged on the robot base. The movement of the upper arm sections is transferred via the lower arm sections to the carrier element. Each lower arm section has two parallel rods or struts running in the longitudinal direction of the arm section, which are moveably connected at their one end to the associated upper arm section and at their other end are moveably connected to the carrier element.

In addition to delta robots, industrial robots with parallel kinematics also include cable robots. Cable robots are equipped with cables as actuating units. Each cable is connected by its one end to a drive. The drives take the form of rotation or linear drives which determine the free length of the cables by winding and unwinding on a shaft connected to a cable end or by advancing or retracting a push rod connected to a cable end. At their end facing away from the drive, the cables are connected to a carrier element for a gripper or a tool. It must be ensured thereby that the cables are tensioned. The gripper or the tool arranged on the carrier element can be moved in several dimensions in a targeted manner by means of the coordinated movement of the drives.

A gripper, a tool or a machine element arranged on the carrier element can additionally be actuated via a pneumatic, hydraulic or electric drive. Sensors for monitoring and controlling the gripper, tool or machine element can also be arranged on the carrier element. For this purpose, hydraulic, pneumatic, electric or optical supply lines are routed from the robot base to the carrier element. The supply lines are used for the transport of compressed air, a pressure medium, electric current or light. Light can be necessary, for example, for a sensor arranged on the gripper or on the tool. The supply lines thereby connect the robot base to the carrier element freely and without guidance or they are guided along the actuating units or along the transfer device.

An industrial robot of this type with actuating units in the form of control arms is known, for example, from EP 250 470 A1.

Known industrial robots with parallel kinematics have the disadvantage that only one rotational degree of freedom is available for the movement of a gripper, tool or machine element arranged on the carrier element. Only one-dimensional rotational movements can therefore be executed with the gripper, tool or machine element.

SUMMARY OF THE INVENTION

The object of the invention is to provide an industrial robot with parallel kinematics that enables a movement of a gripper, tool or machine element on the carrier element, whereby this movement has several rotational degrees of freedom.

This object is achieved by an industrial robot having the features as disclosed herein. It is equipped with two rotational axes and two associated rotational axis drives in addition to the actuating units. The first rotational axis takes the form of an elongated hollow body with a continuous cavity running in the longitudinal direction. Furthermore, the first rotational axis is moveably connected directly or indirectly to the robot base by means of a first joint taking the form of an internally hollow joint with several degrees of freedom. Additionally, the first rotational axis is connected directly or indirectly to the carrier element by means of a second joint taking the form of an internally hollow joint with several degrees of freedom. The cavities of the two hollow joints thereby adjoin the cavity of the elongated hollow body and form a continuous channel from the robot base to the carrier element. A second rotational axis is at least sectionally arranged in this channel. The second rotational axis extends through this channel from the robot base to the carrier element. Its diameter is smaller than the diameter of the first rotational axis. It can project with its ends beyond the channel. A first rotational axis drive and a second rotational axis drive are arranged on the robot base. The first rotational axis drive is linked to the first rotational axis and transmits a first torque of the first rotational axis drive to the first rotational axis, which in turn transmits this first torque to a gripper, a tool or a machine element on the carrier element. The second rotational axis drive is linked to the second rotational axis and transmits a second torque of the second rotational axis drive to the second rotational axis, which in turn transmits this second torque to a gripper, a tool or a machine element on the carrier element. Moreover, further rotational axes can be arranged in the first or second rotational axes that are linked to corresponding further rotational axis drives on the robot base. In this manner two, three or more torques can be transmitted to a gripper, a tool or a machine element on the carrier element. This allows movements with several rotational degrees of freedom to be realised. The rotational axis drives are all arranged in a fixed position on the robot base. They thus do not impede or hinder the movement of the actuating units and the carrier element.

The rotational axes can consist of a light and stable material such as fibre-reinforced plastic.

Advantageously the rotational axes are variable in length. The distance between the robot base and the carrier element changes with the movement of the actuating units. If the rotational axes are variable in their length, they can adapt their length to the different distances between the robot base and the carrier element. Alternatively, the rotational axes can have a fixed length and project upwards above the robot base. This upwardly projecting section varies in its length according to the distance between the robot base and the carrier element.

The rotational axes run advantageously beside the actuating units, so that the actuating units and the rotational axes do not impede each other's movement. Advantageously the rotational axes are arranged in a gap between the actuating units.

The second rotational axis takes the form of a cardan shaft which has a first universal joint and a second universal joint. The cardan shaft can be connected by means of the first universal joint to the second rotational axis drive. The second rotational axis can be connected by means of the second universal joint to a gripper, tool or machine element arranged on the carrier element.

The second rotational axis extends through the first rotational axis with the associated hollow joints. The two rotational axes transmit torques independently of one another to a gripper, tool or machine element arranged on the carrier element.

The cavity of the two assigned joints is joined with the continuous cavity of the first rotational axis. Each of the two internally hollow joints has several joint parts that are moveable relative to one another. These provide for several degrees of freedom of the joint, so that the first rotational axis connected to the carrier element by means of the joint can follow the movement of the carrier element. The carrier element is moved in multiple dimensions in space by means of the actuating units. The joint must therefore permit at least a movement in two dimensions. A movement in respect of a third dimension is rendered possible, for example, by a displaceable arrangement of the elongated hollow body in the longitudinal direction on the robot base or a variable-length embodiment of the elongated hollow body. The joint parts preferably have a continuous cavity or are arranged around a cavity. If the joint parts are arranged inside one another, such as, for example, with a homokinetic joint or a constant velocity joint, the innermost joint part has a cavity through which the second rotational axis is guided. The other joint parts are arranged around the innermost joint part and do not constrict the cavity. If the joint parts are arranged one after the other, such as, for example, with a universal joint or cardan joint with a central joint part and with fork-like joint parts attached thereto in various directions, the cavities of the individual joint parts adjoin one another. Joint parts that connect the joint to the first rotational axis and to the carrier element or to a gripper, tool or machine element arranged on the carrier element, likewise have a hollow form or are arranged around a cavity so that a continuous cavity common to all joint parts is produced or a sequence of cavities arranged one behind the other, which in turn in total produce a common continuous cavity of all joint parts for the second rotational axis. This continuous cavity runs in the axial direction which is the starting position of the joint in which the joint is not deflected. In this starting position the joint can connect two virtual shafts aligned in a parallel manner. The two shafts are aligned offset to one another only through the deflection of the joint. In the case of the joint connected to the first rotational axis, the axial direction of the joint corresponds to the longitudinal direction of the first rotational axis and of the cavity of the first rotational axis. In this starting position the first rotational axis is aligned vertically.

According to an advantageous embodiment of the invention, the second rotational axis is a drive shaft with at least two universal joints having several degrees of freedom and a variable-length intermediate shaft.

According to a further advantageous embodiment of the invention, the first rotational axis is variable in length. The distance between the robot base and the carrier element changes with a movement of the carrier element. The first rotational axis arranged between the robot base and the carrier element must therefore change its length according to the distance.

According to a further advantageous embodiment of the invention, the first rotational axis comprises as components at least two tubes that can be displaced within one another in a telescopic manner. These are mounted inside one another secured against twisting. For this purpose, the tubes can have a circular cross-section. An inner tube is thereby equipped with bosses radially projecting outwards, while the outer tube has grooves that are adapted to the bosses. Bosses and grooves run in the longitudinal direction of the tubes. Furthermore, the tubes can also have a cross-section that deviates from a circular shape, for example, an oval or angular cross-section. The elongated hollow body comprising at least two tubes arranged inside one another in a telescopic manner has the advantage that it is variable in its length and adapts to the variable distance between the robot base and the carrier element. Furthermore, large torques can be transferred even by tubes with a low weight. However, there is also the possibility of using flexible drive shafts as elongated hollow bodies. These likewise take the form of hollow bodies and can thus accommodate the second rotational axis. Furthermore, the first rotational axis can have only one rigid tube. In order to take into account the variable distance between the robot base and the carrier element, the tube can be displaceably mounted on the robot base.

According to a further advantageous embodiment of the invention, the hollow joints of the first rotational axis and/or the universal joints of the second rotational axis are cardan joints. They have a central tubular or annular joint part equipped with crossed axles or pairs of axle stubs. A cardan joint is also referred to as a universal joint due to the intersecting axles. In the case of the hollow joints the joint parts have a continuous cavity. To this end the joint parts can, for example, have the form of rings, tubes or tube sections.

According to a further advantageous embodiment of the invention, the joints are constant velocity joints in which the inner joint part has a continuous cavity which goes through the joint part completely. The other joint parts are arranged around the inner joint part. Constant velocity joints are also referred to as homokinetic joints.

According to a further advantageous embodiment of the invention, the carrier element is equipped with a ring or hollow shaft rotatably mounted in the carrier element. The ring or the hollow shaft is connected at its end facing towards the first rotational axis to the hollow joint and at its end facing away from the first rotational axis to a gripper, tool or machine element.

According to a further advantageous embodiment of the invention, the first rotational axis together with the joint or joints likewise takes the form of a cardan shaft at its ends with length compensation for transmitting torques from a rotation drive arranged on the robot base as first rotational axis drive to a gripper, tool or machine element arranged on the carrier element.

According to a further advantageous embodiment of the invention, the first rotational axis is rigid. In this manner no deformation of the first rotational axis takes place. Furthermore, forces can be transmitted to the carrier element or to a gripper or a tool arranged on the carrier element through the first rotational axis by means of an additional drive.

According to a further advantageous embodiment of the invention, the second rotational axis is variable in length. The distance between the robot base and the carrier element changes with a movement of the carrier element. If the second rotational axis is variable in length, it can adapt its length to the distance between the robot base and the carrier element.

According to a further advantageous embodiment of the invention, the second rotational axis comprises at least two tubes that can be displaced within one another in a telescopic manner. Preferably the two tubes are arranged inside one another secured against twisting. The second rotational axis can in this respect take the form of the first rotational axis.

According to a further advantageous embodiment of the invention, the second rotational axis takes the form of an elongated hollow body with a continuous cavity running in axial direction. This cavity together with the hollow universal joints arranged on the second rotational axis forms a continuous channel from the robot base to the carrier element.

According to a further advantageous embodiment of the invention, a third rotational axis is arranged at least partially in the continuous channel of the second rotational axis. A third rotational axis drive which generates a third torque is arranged on the robot base. The third rotational axis drive is linked to the third rotational axis, which transmits the third torque to a gripper, a tool or a machine element on the carrier element. In this manner three torques can be transmitted to a gripper, a tool or a machine element on the carrier element. The third rotational axis can in turn have a continuous cavity in which a fourth rotational axis is arranged. The fourth rotational axis is again linked to a fourth rotational axis drive. Further rotational axes and rotational axis drives may be provided accordingly. Each rotational axis transmits a torque of its assigned rotational axis drive to a gripper, a tool or a machine element independently of the other rotational axes. Many rotational degrees of freedom can accordingly be realised.

According to a further advantageous embodiment of the invention, the rotational axes are arranged coaxially to one another.

According to a further advantageous embodiment of the invention, several second rotational axes are arranged at least sectionally parallel to one another in the first rotational axis. Each second rotational axis is assigned a separate rotational axis drive on the robot base. The second rotational axes can have a different length. In particular, they may project in different lengths beyond the robot base.

According to a further advantageous embodiment of the invention, at least one pneumatic and/or hydraulic and/or electric and/or optical supply line for a gripper arranged on the carrier element, a tool arranged on the carrier element or a machine element arranged on the carrier element is arranged in the continuous channel of the first rotational axis. Supply lines from the robot base to the carrier element can thereby be laid in the first rotational axis. They are thus protected both from dirt and contamination and from damage. If the second rotational axis likewise takes a hollow form, such supply lines can also be arranged in the second rotational axis.

The universal shafts can be used not only in industrial robots with parallel kinematics but also in other industrial robots. This also applies for several universal shafts arranged inside one another.

Further advantages and advantageous embodiments of the invention can be obtained from the following description, the drawing and the claims.

BRIEF DESCRIPTION OF THE DRAWINGS

The drawing shows a model embodiment of the invention which is described in more detail below. Illustrations.

DETAILED DESCRIPTION OF THE INVENTION

Figure 1:
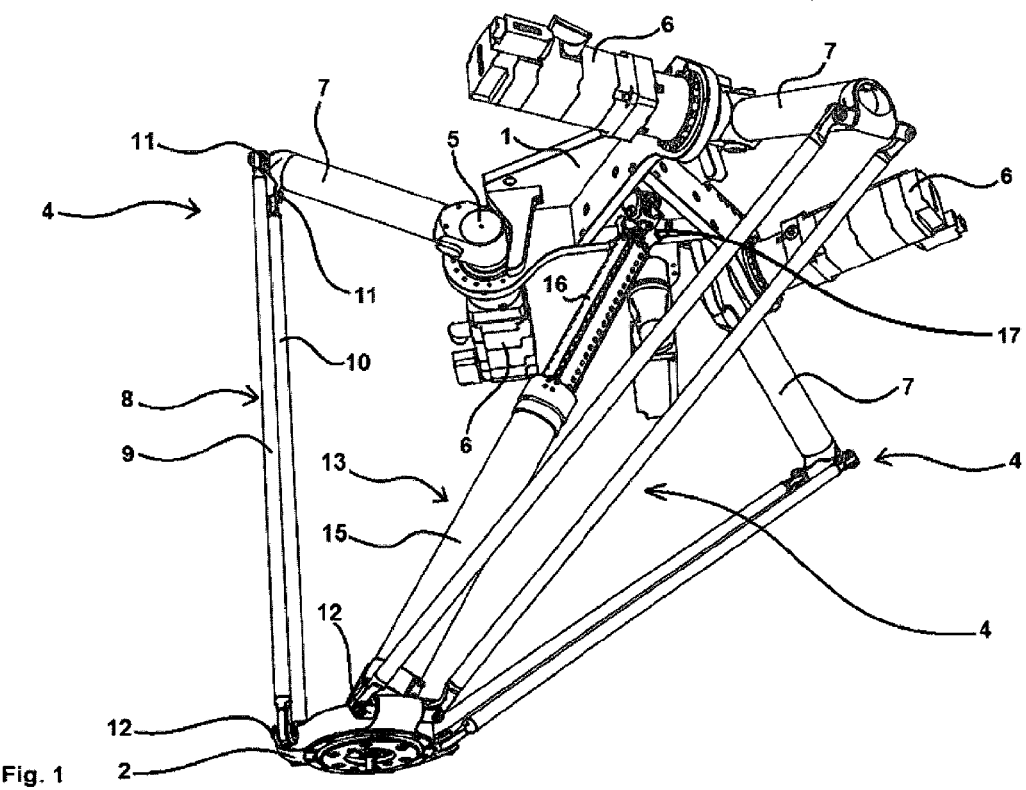
FIG. 1 First model embodiment of an industrial robot with parallel kinematics in a perspective view FIG. 2 Industrial robot as shown in FIG. 1 in a view from the side FIG. 3 Industrial robot as shown in FIG. 1 in a perspective view from above FIG. 4 Industrial robot as shown in FIG. 1 in a view from above FIG. 5 Industrial robot as shown in FIG. 1 in a view from below FIG. 6 Detail of a vertical section through the robot base of the industrial robot as shown in FIG. 1
Figure 2:
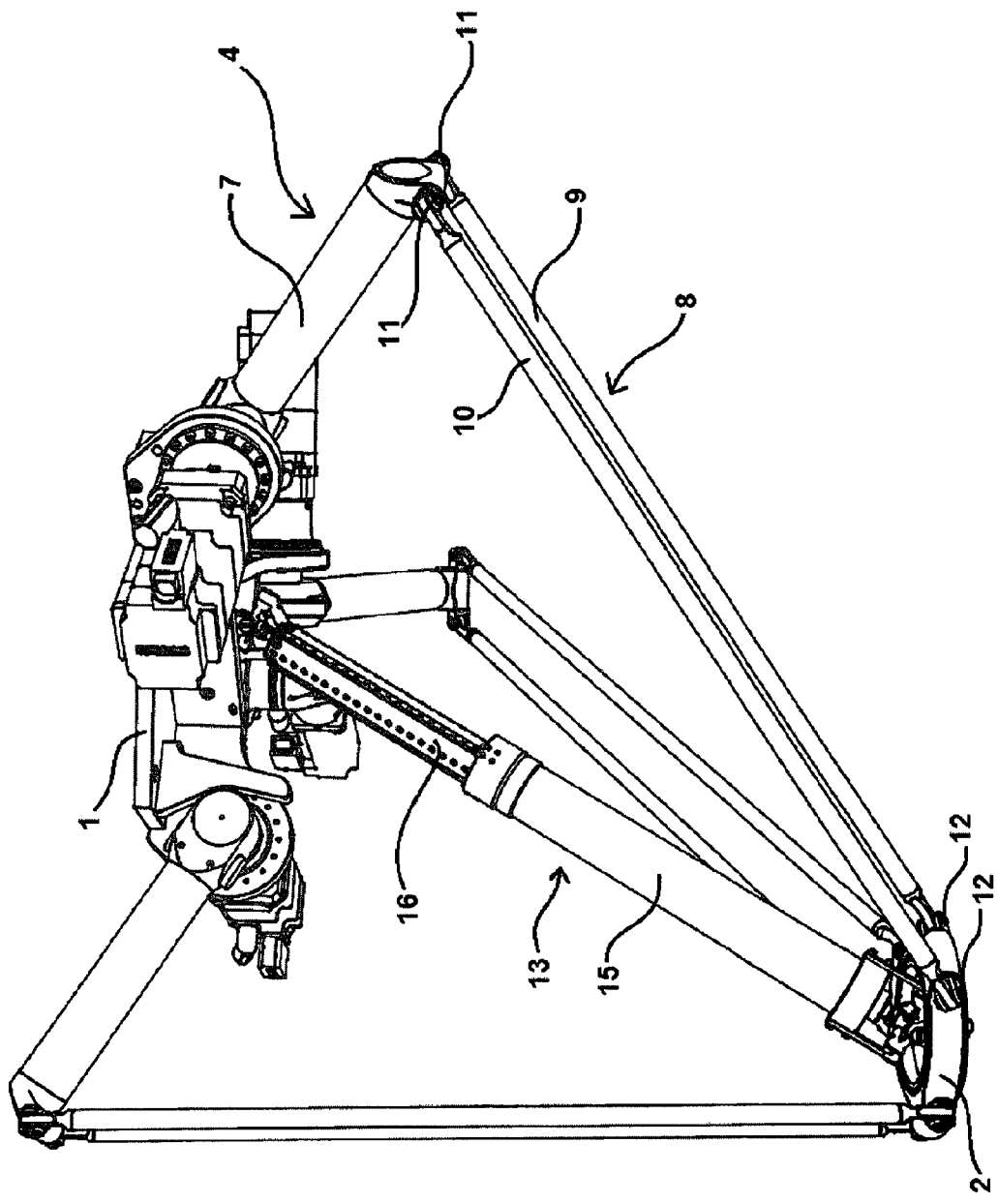
Figure 3:
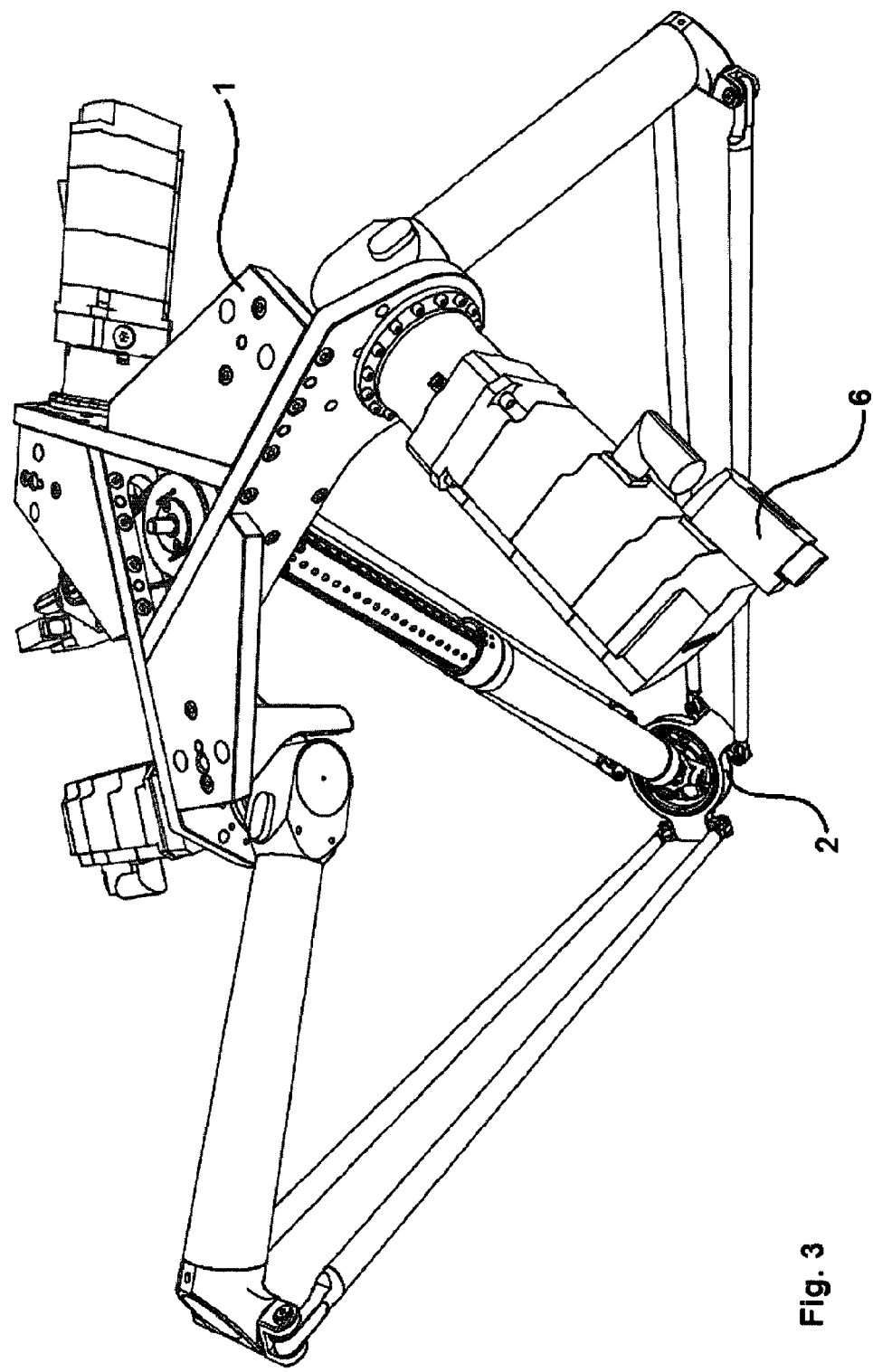

FIGS. 1 to 10 show a first model embodiment of an industrial robot with parallel kinematics according to the delta principle having a robot base 1, a carrier element 2 to which a gripper, a tool or a machine element can be arranged, and three actuating units 4 in the form of control arms. The gripper, the tool or the machine element are not shown in the drawing. Each of the three actuating units is connected by means of a drive shaft 5 to an actuating unit drive 6 in the form of a motor. All three actuating units 4 have the same design. The actuating units 4 comprise an upper arm section 7 and a lower arm section 8. The upper arm section 7 is characterised by high stability and low weight. The lower arm section 8 comprises two parallel running rods 9 and 10. The two rods 9 and 10 of the lower arm section 8 of an actuating unit 4 are connected by means of joints 11 at their upper end to the upper arm section 7 of the actuating unit 4 and by means of joints 12 to the carrier element 2.

The industrial robot is further equipped with a first rotational axis 13 in the form of a hollow body. It is used to transmit a torque of a first rotational axis drive 14 discernible in FIG. 4 that is arranged on the robot base 1 to a gripper or tool or machine element not shown in the drawing on the carrier element. The first rotational axis 13 comprises two tubes 15 and 16 that can be displaced within one another in a telescopic manner. The displaceable mounting allows variations in distance between the robot base 1 and the carrier element 2 in a movement of the actuating units 4 to be compensated. The upper tube 16 is moveably connected by means of a first joint 17 to the robot base 1. The first joint is particularly discernible in FIG. 6 and in FIG. 8. The first joint 17 comprises two joint parts 18 and 19 which are rotatably arranged around axes 20 and 21 running perpendicular to one another. This is a cardan joint or universal joint. The two joint parts 18 and 19 comprise a continuous cavity through which a universal shaft 22 extends. This is discernible in FIGS. 6 and 7. The continuous cavity can also be referred to as a channel.

Figure 7:
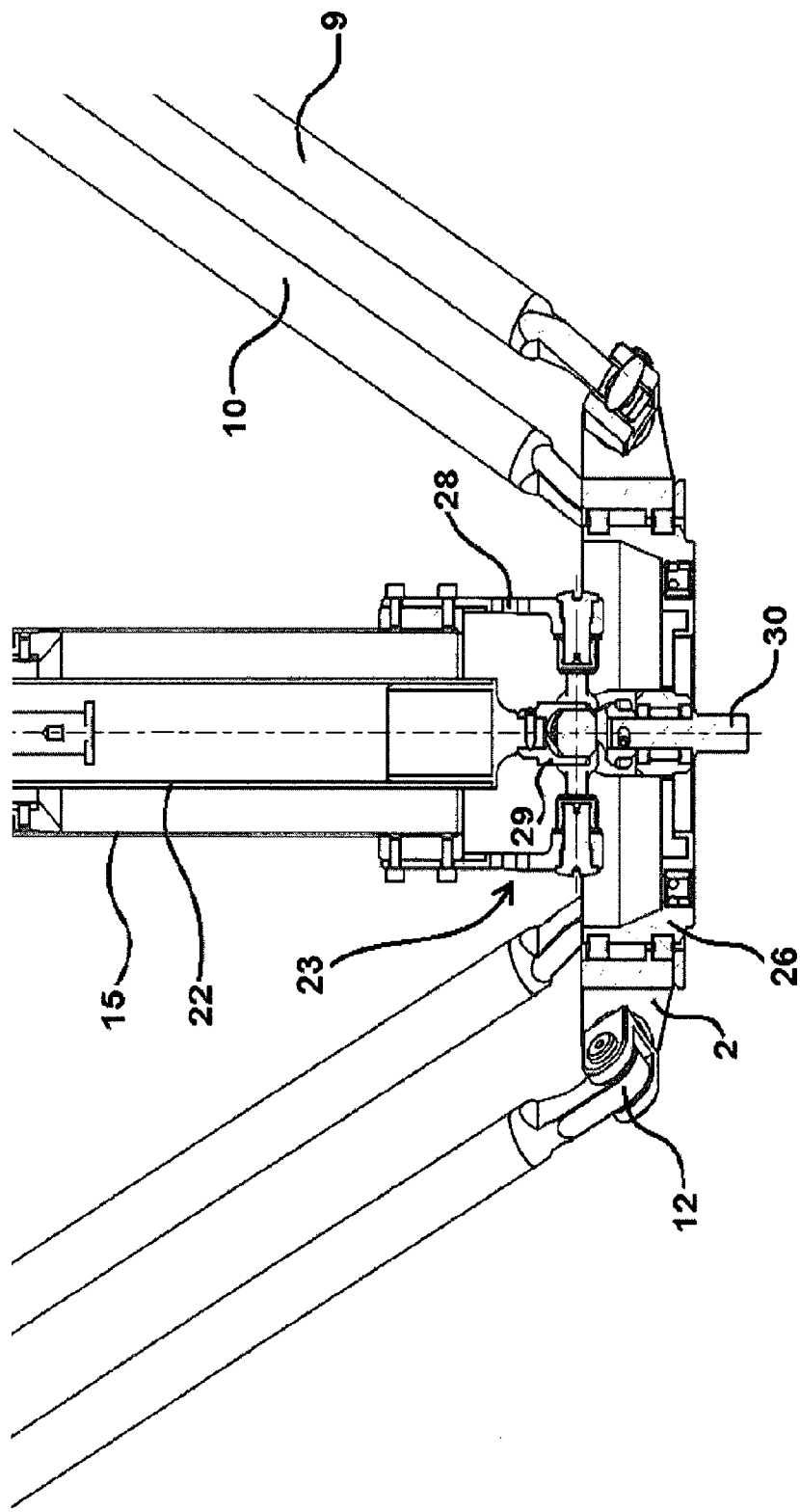
FIG. 7 Vertical section through the carrier element of the industrial robot as shown in FIG. 1
Figure 10:
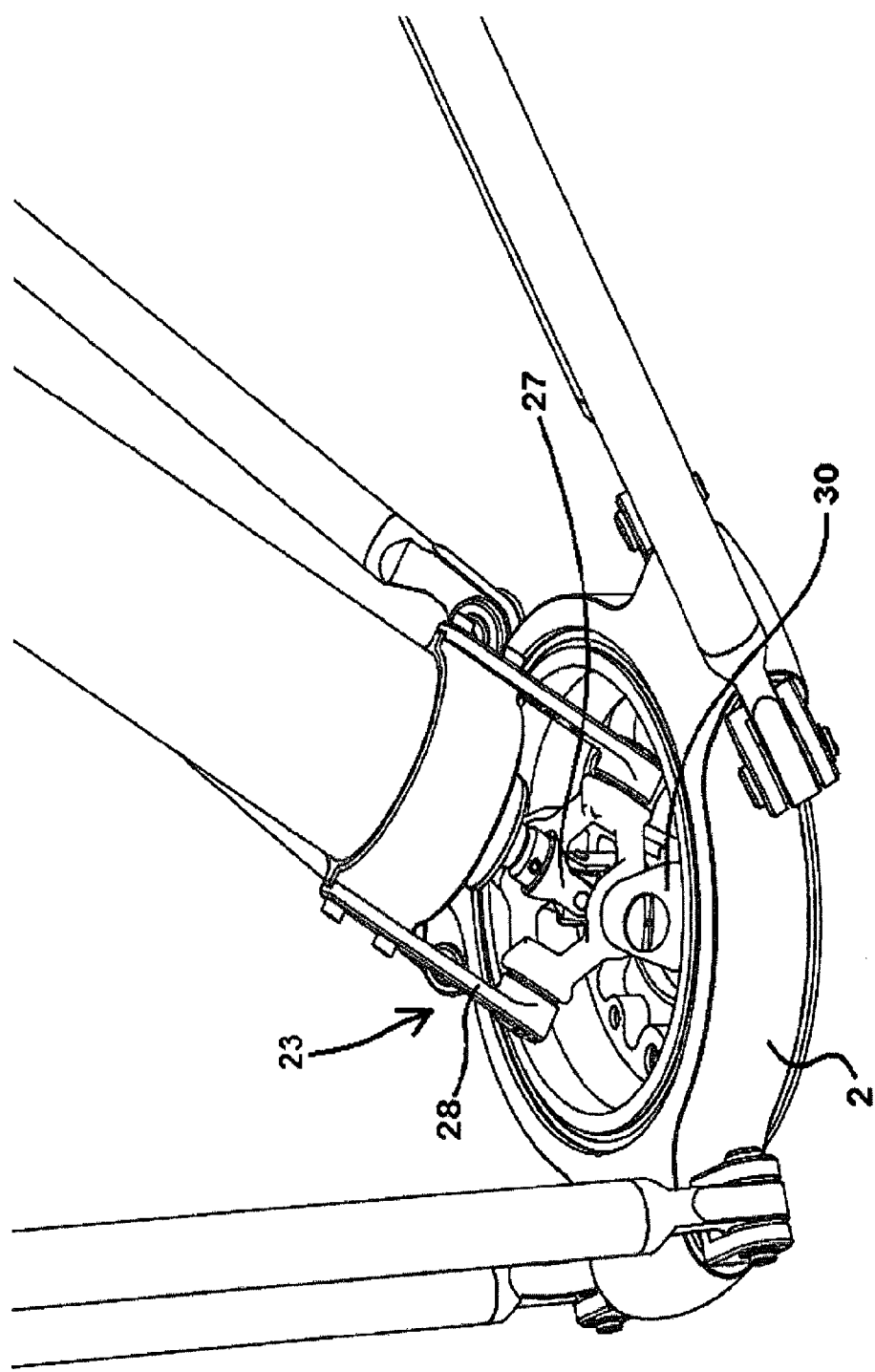
FIG. 10 Perspective view from above of the carrier element of the industrial robot as shown in FIG. 1

The lower tube 15 of the first rotational axis 13 is moveably connected to the carrier element 2 by means of a corresponding second joint 23. This is represented in FIGS. 7 and 10. The two joints 17, 23 allow the variable-length first rotational axis 13 to follow a deflection of the carrier element 2 relative to the robot base 1.

Figure 4:
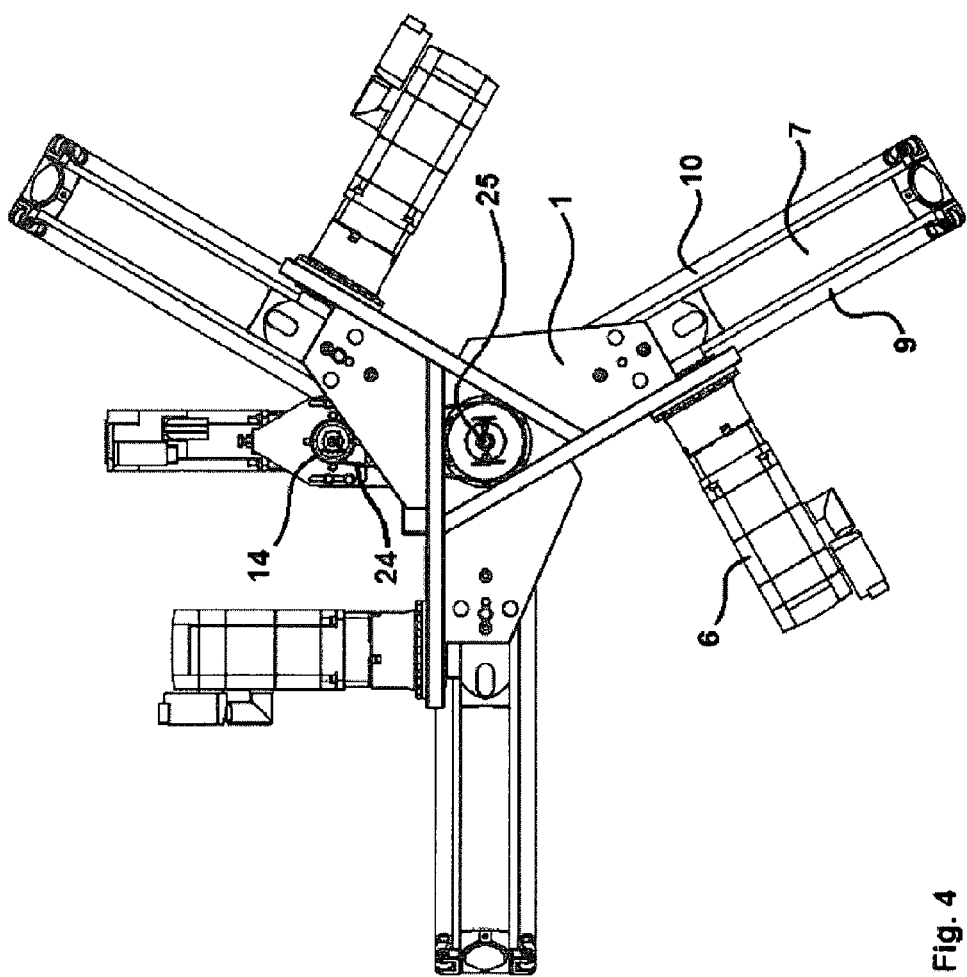

FIG. 4 shows the industrial robot in a view from above. This representation shows the first rotational axis drive 14, which is arranged in a fixed position on the robot base 1 and drives the first rotational axis 13 to rotation by means of a toothed belt 24. FIG. 4 also shows a shaft stub 25 that is connected to the universal shaft 22. To this shaft stub a second rotational axis drive is linked which is not represented in the drawing, that drives the second rotational axis 22 to rotation. This second rotational axis drive is likewise arranged in a fixed position on the robot base. In the representation shown in FIG. 4 the upper arm sections 7 of the actuating units 4, the rods 9 and 10 of the lower arm sections 8 and the actuating unit drive 6 are also discernible.

Figure 5:
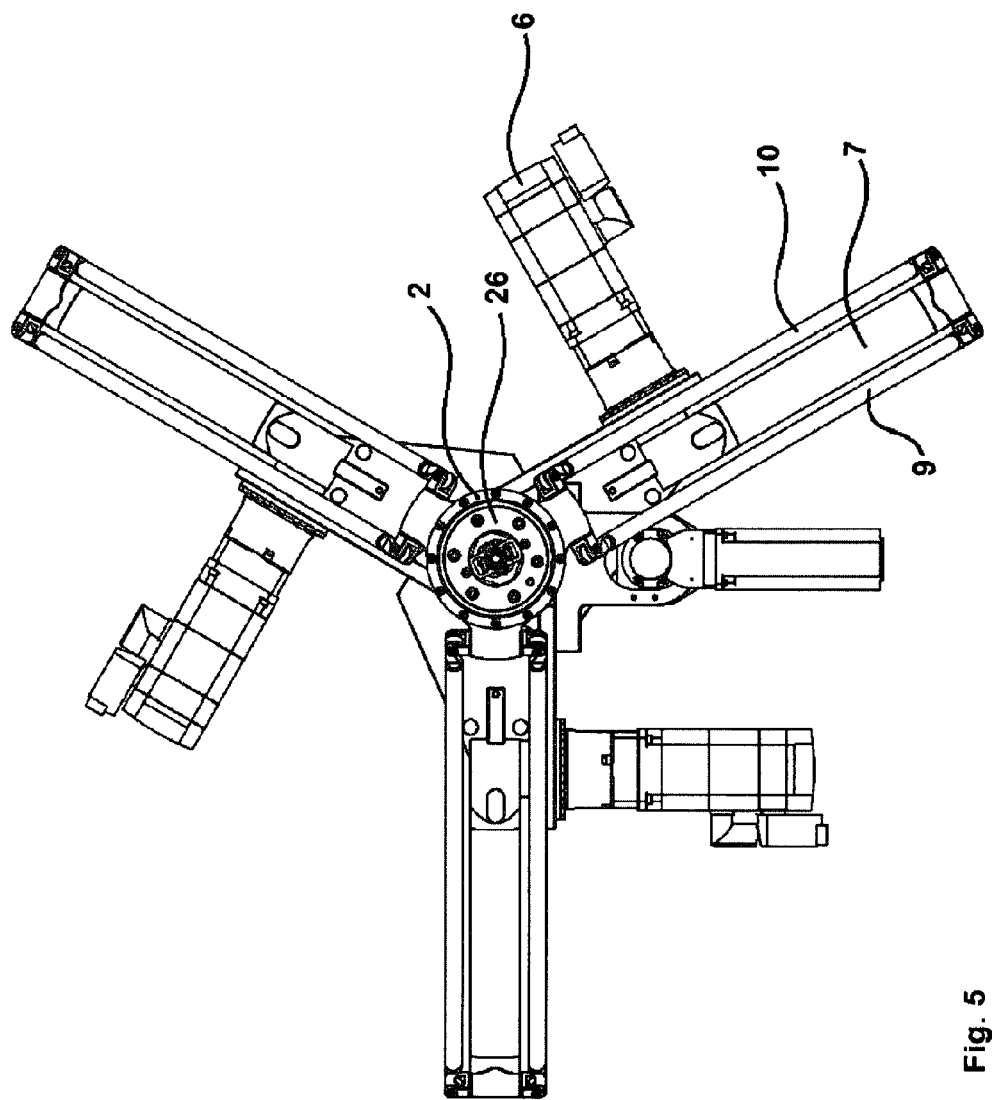

FIG. 5 shows the industrial robot in a view from below. In this representation the carrier element 2 and a ring 26 rotatably arranged in the carrier element 2 are discernible. The ring is connected by means of the joint 23 to the first rotational axis 13. The torque of the first rotational axis drive 14 is transmitted by means of the hollow joints 17, 23 and the first rotational axis 13 to the ring 26.

Figure 6:
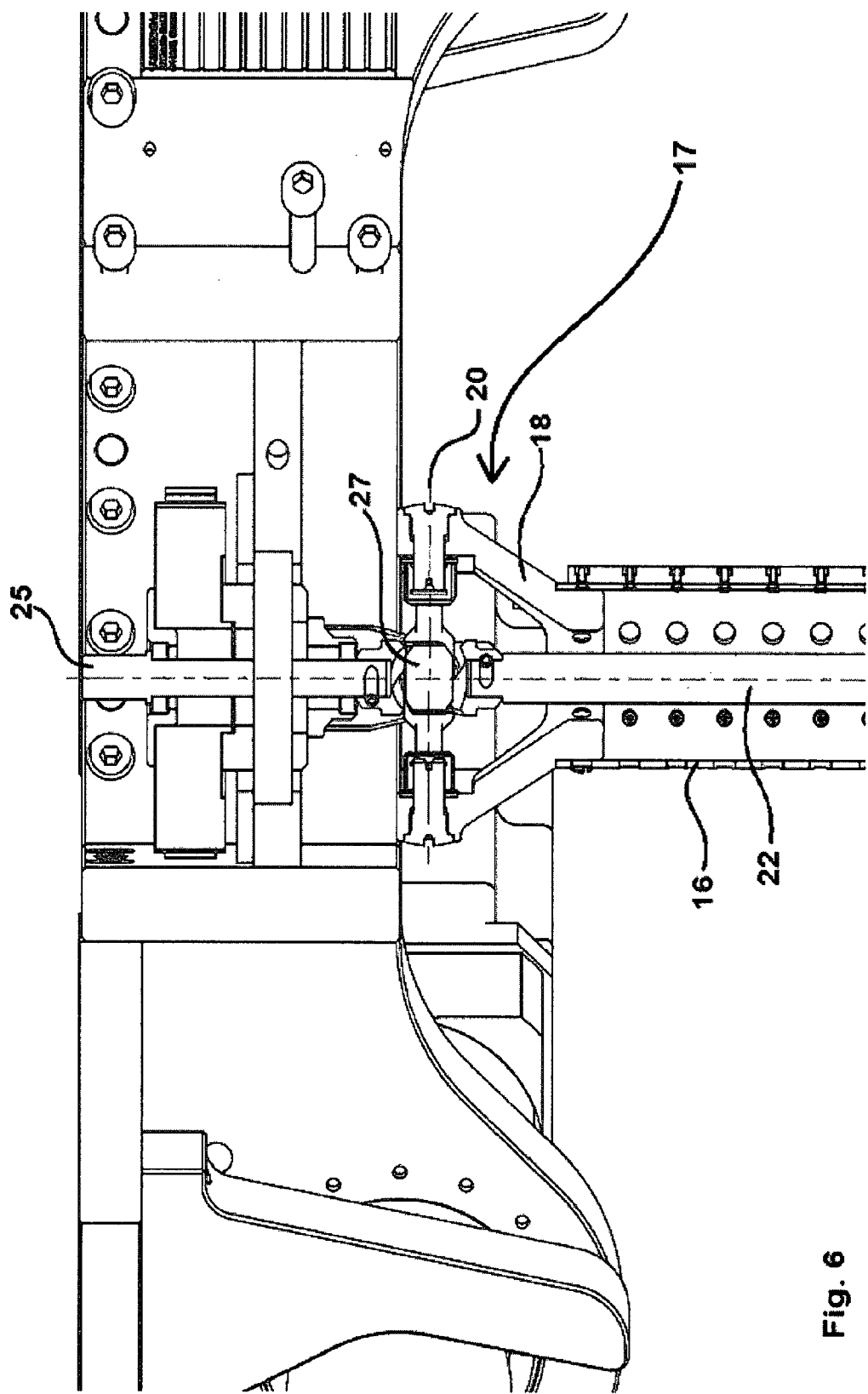

FIG. 6 shows a detail of a vertical section through the robot base 1. In this representation an upper section of the tube 16 of the first rotational axis, a joint fork 18 of the first joint with the axis 20, the universal shaft 22 with a first universal joint 27 and a shaft stub 25 connected to the first universal joint are discernible.

FIG. 7 shows a vertical section through the carrier element 2. In this representation the rods 9, 10 of the lower arm sections of the actuating units with their joints 12, the tube 15, a joint fork 28 of the hollow joint 23, the ring 26 linked to the joint 23, the universal shaft 22, a second universal joint 29 of the universal shaft 22 and a second shaft stub 30 are discernible. The second shaft stub 30 is linked to the second universal joint 29. A gripper, tool or machine element can be connected to it. These are not illustrated in the drawing.

Figure 8:
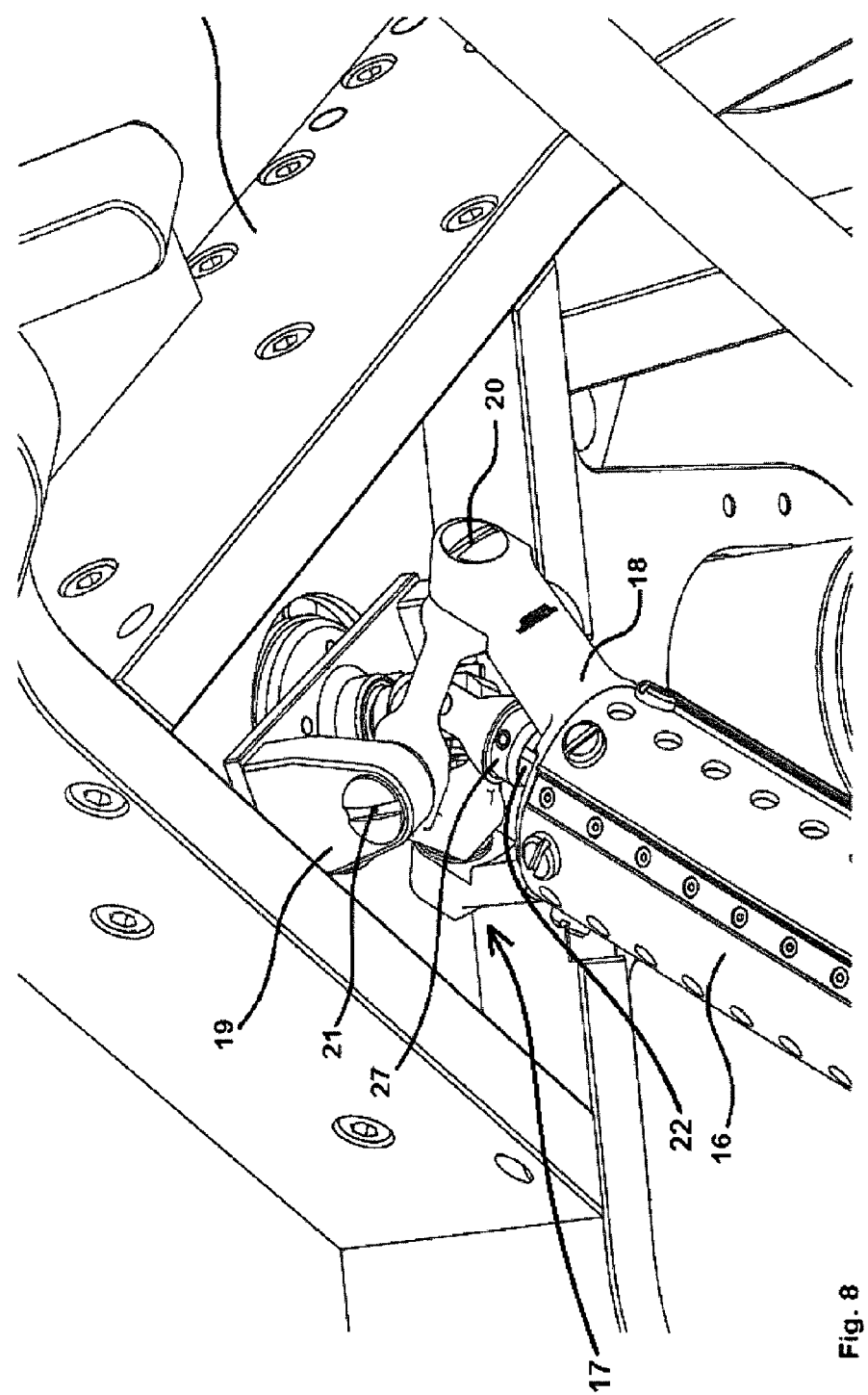
FIG. 8 Perspective view from below of the robot base of the industrial robot as shown in FIG. 1

FIG. 8 shows a perspective view of an upper part of the tube 16 of the first rotational axis with the two joint forks 18, 19 of the first hollow joint and the associated perpendicular axes 20 and 21, the second rotational axis 22 and the first universal joint 27 arranged on the second rotational axis 22.

Figure 9:
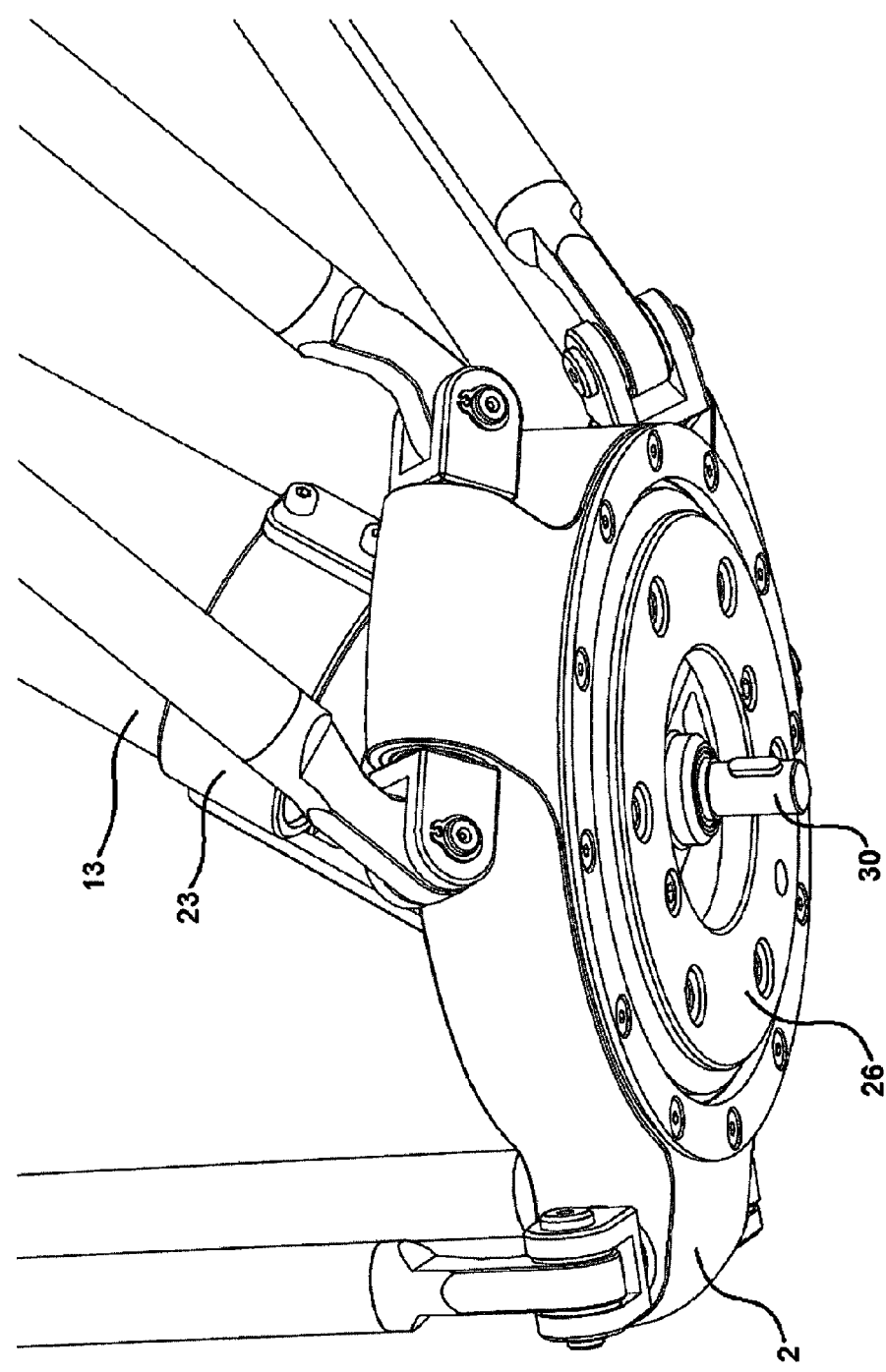
FIG. 9 Perspective view from below of the carrier element of the industrial robot as shown in FIG. 1

FIG. 9 shows the carrier element 2 in a perspective view from below. In this representation the ring 26, which is linked to the first rotational axis 13 by means of the second hollow joint 23, and the second shaft stub 30, which is linked to the universal shaft by means of the second universal joint, are discernible.

FIG. 10 shows the carrier element 2 in a perspective view from above. In this representation the joint forks 28, 31 of the second hollow joint 23 and the second universal joint 27 of the second rotational axis are discernible.

Figure 11:
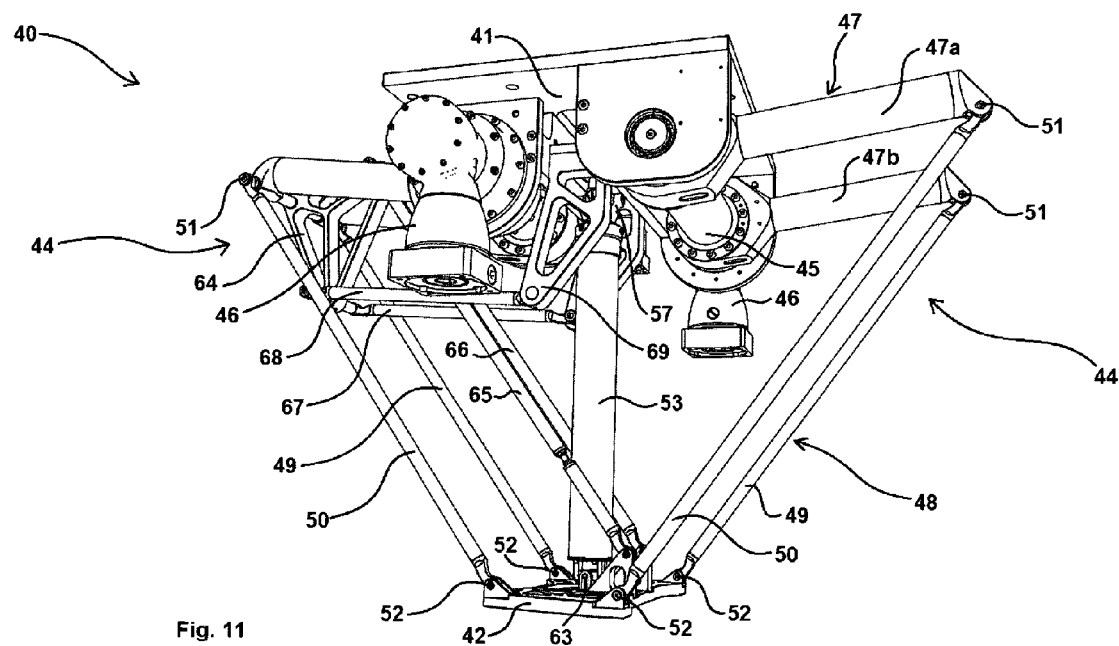
FIG. 11 Second model embodiment of an industrial robot with parallel kinematics in a perspective view FIG. 12 Industrial robot as shown in FIG. 11 in a vertical section
Figure 12:
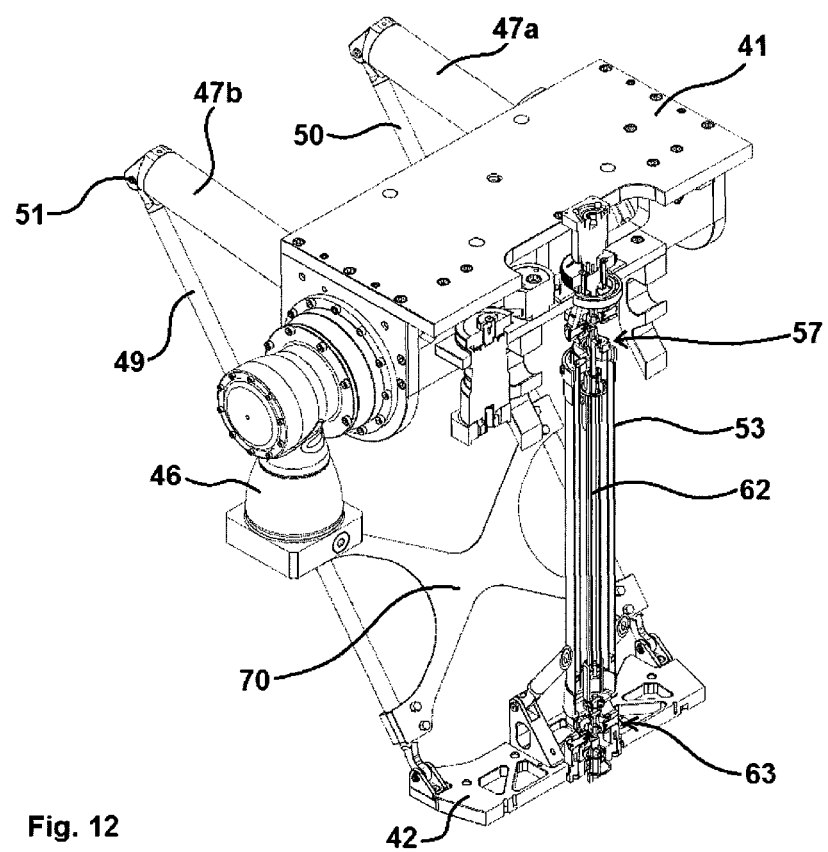

FIGS. 11 and 12 represent a second model embodiment of an industrial robot 40 with parallel kinematics. In contrast to the first model embodiment, the industrial robot 40 shown in FIG. 11 has not three but two actuating units. It is equipped with a robot base 41, a carrier element 42 on which a gripper, a tool or a machine element can be arranged, and two actuating units 44 in the form of control arms. The gripper, the tool or the machine element are not represented in the drawing. Each of the two actuating units 44 is connected by means of a drive shaft 45 to an actuating unit drive 46 in the form of a motor. The actuating units 44 comprise an upper arm section 47 and a lower arm section 48. The upper arm section 47 comprises two parallel struts 47a and 47b that are arranged with their one end on the drive shaft 45. The parallel struts 47a and 47b form an upper arm pair. The lower arm section 48 comprises two parallel running rods 49 and 50 that form a lower arm pair. The two rods 49 and 50 of the lower arm section 48 are connected by means of joints 51 at their upper end to the struts 47a and 47b of the upper arm section 47 and by means of joints 52 to the carrier element 42.

Exactly as in the first model embodiment, the industrial robot according to the second model embodiment is equipped with a first rotational axis 53 in the form of a hollow body. On the robot base 41 a first rotational axis drive is arranged that is not discernible in the drawing. This first rotational axis drive generates a first torque that is transmitted by means of the first rotational axis 53 to a gripper or tool or machine element not represented in the drawing on the carrier element 42. In accordance with the first model embodiment, the first rotational axis 53 is moveably connected to the robot base 41 by means of a first joint 57 and to the carrier element 42 by means of a second joint 63. The two joints 57 and 63 are cardan joints and essentially coincide with the corresponding joints 17 and 23 of the first model embodiment.

Exactly as in the first model embodiment, a second rotational axis 62 in the form of a universal shaft is arranged in the first rotational axis 53. On the robot base 41 a second rotational axis drive is arranged to which the second rotational axis is linked and whose torque the second rotational axis transmits to a gripper, tool or machine element on the carrier element 42. The second rotational axis is discernible in FIG. 12. The second rotational axis drive is not discernible in the drawing.

A first two-armed lever 64 is connected to the struts 47a and 47b of the upper arm section 47 of the left actuating unit 44. A first arm of this first lever 64 is connected to the carrier element 42 by means of the struts 65 and 66. A second arm of the first lever 64 is connected to a second lever 69 by means of the struts 67 and 68. This second lever 69 takes the form of a one-armed lever. While the one end of the second lever 69 is connected to the struts 67, 68, the other end of the second lever 69 is connected to the drive shaft 45 of the right actuating unit 44. The first lever 64, the second lever 69 and the struts 65, 66, 67, 68 ensure that the carrier element 42 is always aligned parallel to the robot base 41 regardless of the movement and the setting of the actuating units 44. In this manner a tipping of the carrier element 42 is prevented.

FIG. 12 shows the industrial robot according to FIG. 11 in a vertical section along the longitudinal axis of the vertically aligned first rotational axis 53. The second rotational axis 62, which is arranged coaxially to the first rotational axis 53 in the first rotational axis 53, is discernible in this representation. The diameter of the second rotational axis 62 is smaller than the diameter of the first rotational axis 53. The second rotational axis 62 extends through the first rotational axis 53, the first joint 57 and the second joint 63. The second rotational axis is equipped with universal joints at the end projecting upwards and downwards beyond the first rotational axis.

The industrial robot represented in FIG. 12 is equipped with a reinforcing cross 70 that is arranged on the rods 49 and 50 of the lower arm section 48.

All features of the invention can be material to the invention both individually and in any combination.

REFERENCE NUMBERS

1 Robot base
2 Carrier element
3
4 Actuating unit
5 Drive shaft
6 Actuating unit drive
7 Upper arm section
8 Lower arm section
9 Rod
10 Rod
11 Joint
12 Joint
13 First rotational axis
14 First rotational axis drive
15 Tube
16 Tube
17 First joint
18 Joint fork
19 Joint fork
20 Axis
21 Axis
22 Second rotational axis
23 Second joint
24 Toothed belt
25 Shaft stub
26 Ring
27 First universal joint
28 Joint fork
29 Second universal joint
30 Second shaft stub
31 Joint fork
40 Industrial robot
41 Robot base
42 Carrier element
44 Actuating unit
45 Drive shaft
46 Actuating unit drive
47 Upper arm section
47a Strut
47b Strut
48 Lower arm section
49 Rod
50 Rod
51 Joint
52 Joint
53 First rotational axis
57 First joint
62 Second rotational axis
63 Second joint
64 First lever
65 Strut
66 Strut
67 Strut
68 Strut
69 Second lever
70 Reinforcing cross

The invention claimed is:

1. Industrial robot with parallel kinematics, comprising: a robot base, with a carrier element for holding a gripper, a tool or a machine element, with at least two moveable actuating units that are connected at one end to actuating unit drives arranged on the robot base and are moveably connected at the other end to the carrier element, with a first rotational axis in a form of a hollow body which has a continuous, axially-running cavity, with a first joint which has a continuous cavity and with several degrees of freedom by means of which the first rotational axis is connected directly or indirectly to the robot base, with a second joint which has a continuous cavity and with several degrees of freedom by means of which the first rotational axis is moveably connected to the carrier element, whereby the cavities of the first joint, the first rotational axis and the second joint form a continuous channel from the robot base to the carrier element, with a first rotational axis drive on the robot base which generates a first torque, whereby the first rotational axis drive is linked to the first rotational axis, which transmits the first torque to a gripper, a tool or a machine element on the carrier element, with second rotational axis in a form of a universal shaft which is at least partially arranged in the continuous channel, with a second rotational axis drive on the robot base which generates a second torque, whereby the second rotational axis drive is linked to the second rotational axis, which transmits the second torque to a gripper, a tool or a machine element on the carrier element.

2. Industrial robot according to claim 1, wherein the second rotational axis, is a drive shaft with at least two universal joints having several degrees of freedom and a variable-length intermediate shaft.

3. Industrial robot according to claim 1, wherein the first rotational axis is variable in length.

4. Industrial robot according to claim 3, wherein the first rotational axis has at least two tubes that can be displaced within one another in a telescopic manner.

5. Industrial robot according to claim 1, wherein the second rotational axis is variable in length and has at least two tubes that can be displaced within one another in a telescopic manner and that the two tubes are arranged inside one another secured against twisting.

6. Industrial robot according to claim 1, wherein the second rotational axis takes the form of an elongated hollow body with a continuous cavity running in the axial direction that together with hollow universal joints arranged on the second rotational axis forms a continuous channel from the robot base to the carrier element.

7. Industrial robot according to claim 6, wherein a third rotational axis is arranged at least partially in the continuous channel of the second rotational axis, that a third rotational axis drive which generates a third torque is arranged on the robot base and that the third rotational axis is linked to the third rotational axis drive which transmits the third torque to a gripper, a tool or a machine element on the carrier element.

8. Industrial robot according to claim 1, wherein the rotational axes are arranged coaxially.

9. Industrial robot according to claim 1, wherein several second rotational axes are arranged at least sectionally parallel to one another in the first rotational axis.

10. Industrial robot according to claim 1, wherein at least one pneumatic and/or hydraulic and/or electric and/or optical supply line for a gripper arranged on the carrier element, a tool arranged on the carrier element or a machine element arranged on the carrier element is arranged in the continuous channel of the first rotational axis.

* * * * *